(12) United States Patent
Ribeiro et al.

(10) Patent No.: US 10,671,190 B2
(45) Date of Patent: Jun. 2, 2020

(54) STYLUS PEN WITH DYNAMIC PROTOCOL SELECTION FOR COMMUNICATION WITH A DIGITIZER

(71) Applicant: Microsoft Technology Licensing, LLC, Redmond, WA (US)

(72) Inventors: Flavio Protasio Ribeiro, Bellevue, WA (US); Steven Bathiche, Kirkland, WA (US); Woo Suk Lee, Brownsburg, IN (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/874,229

(22) Filed: Oct. 2, 2015

(65) Prior Publication Data

US 2017/0097695 A1     Apr. 6, 2017

(51) Int. Cl.
*G06F 3/038* (2013.01)
*G06F 3/041* (2006.01)
*G06F 3/0354* (2013.01)
*G06F 3/044* (2006.01)

(52) U.S. Cl.
CPC ............ *G06F 3/0383* (2013.01); *G06F 3/038* (2013.01); *G06F 3/03545* (2013.01); *G06F 3/044* (2013.01); *G06F 3/0416* (2013.01); *G06F 3/04162* (2019.05); *G06F 2203/0384* (2013.01)

(58) Field of Classification Search
None
See application file for complete search history.

(56) References Cited

U.S. PATENT DOCUMENTS

| 2004/0160429 A1* | 8/2004 | Blake | G06F 3/03545 345/179 |
| 2010/0321338 A1* | 12/2010 | Ely | G06F 3/03545 345/174 |
| 2012/0013555 A1 | 1/2012 | Maeda et al. | |

(Continued)

FOREIGN PATENT DOCUMENTS

| WO | WO 2014/066621 A2 | 5/2014 |
| WO | WO 2015/036999 A1 | 3/2015 |

OTHER PUBLICATIONS

"USI Launched to Create a Specification for an Active Stylus", Published on: Apr. 23, 2015, Available at: http://www.universalstylus.org/news-events/usi-launched/.

(Continued)

*Primary Examiner* — Sahlu Okebato
(74) *Attorney, Agent, or Firm* — Alleman Hall Creaseman & Tuttle LLP

(57) ABSTRACT

A stylus pen is disclosed that can detect touch signals from a digitizer and dynamically determine which digitizer (e.g., make/model) generated the touch signals. The stylus pen can then switch to one of a plurality of candidate protocols, without interaction from the user, so as to communicate with the digitizer. The digitizer need not explicitly communicate what protocol it supports to the stylus pen. Rather, the stylus pen analyzes the digitizer waveforms and compares the waveforms to known signatures to determine which digitizer is being used. The stylus pen can then dynamically set a protocol used to communicate with the digitizer that matches the protocol expected by the digitizer.

16 Claims, 15 Drawing Sheets

(56) References Cited

U.S. PATENT DOCUMENTS

| | | |
|---|---|---|
| 2012/0050231 A1 | 3/2012 | Westhues et al. |
| 2013/0106713 A1 | 5/2013 | Shahparnia et al. |
| 2013/0106718 A1 | 5/2013 | Sundara-Rajan |
| 2014/0073994 A1* | 3/2014 | Machado ............ A61B 5/6897 600/595 |
| 2014/0145066 A1 | 5/2014 | Geaghan et al. |
| 2014/0176495 A1* | 6/2014 | Vlasov ................ G06F 3/03545 345/174 |
| 2014/0218343 A1 | 8/2014 | Hicks et al. |
| 2014/0253462 A1 | 9/2014 | Hicks |
| 2014/0256250 A1 | 9/2014 | Cueto et al. |
| 2014/0267070 A1 | 9/2014 | Shahparnia et al. |
| 2014/0267184 A1 | 9/2014 | Bathiche et al. |
| 2015/0029162 A1 | 1/2015 | Harris et al. |
| 2015/0054776 A1 | 2/2015 | Reitan et al. |
| 2015/0103049 A1 | 4/2015 | Harley et al. |
| 2015/0363012 A1* | 12/2015 | Sundara-Rajan ....... G06F 3/038 345/179 |
| 2016/0357339 A1* | 12/2016 | Ritchey ................... G06F 3/041 |
| 2016/0378217 A1* | 12/2016 | Kim ...................... G06F 3/0482 345/173 |

OTHER PUBLICATIONS

International Search Report and Written Opinion for PCT/US2016/051421, dated Dec. 2, 2016, 13 pages.
"Office Action Issued in European Patent Application No. 16775381.3", dated Jun. 21, 2019, 5 Pages.

* cited by examiner

DETAILS OF SIGNAL PROCESSING CIRCUITRY

FIG. 8 EXAMPLE MEASUREMENTS OF DIGITIZER TOUCH SIGNAL TRANSMISSIONS

STYLUS PEN WITH DYNAMIC PROTOCOL SELECTION FOR COMMUNICATION WITH A DIGITIZER

BACKGROUND

A stylus or a stylus pen is often used as an input device to a digitizer associated with a computer screen, mobile device, graphics tablet, and other devices. With touchscreen devices, a user places a stylus on the surface of the screen to write, draw, or make selections by tapping the stylus on the screen. As such, the stylus is used as a pointing device in addition to a mouse, track pad, or finger.

There are a variety of manufacturers of digitizers and each requires a different protocol with which the stylus communicates. Thus, each digitizer requires a user to purchase a different stylus. Maintenance of multiple styluses for users that have multiple digitizers is inefficient and costly to users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A stylus pen is disclosed that can be used as an input device to a digitizer associated with a computer screen on a computing device, such as a computer, mobile device, tablet, etc. The stylus pen can include circuitry for monitoring digitizer touch signals and determining a protocol that can be used to communicate with the digitizer.

The stylus pen includes circuitry for reading a digitizer's touch signals and for analyzing the touch signals to determine which of multiple protocols to use for communication with the digitizer. The stylus pen can be configured based on a selected protocol such that transmission signals are synchronized with the digitizer's communication protocol. For example, selection of the protocol can dictate voltage levels, operating frequencies, modulation types (e.g., phase, frequency, amplitude or code modulation), bit assignments, etc., associated with signals that the stylus pen transmits to the digitizer. Each of these characteristics should comport with the characteristics of the digitizer. Thus, using the analysis of the touch signals, the stylus pen can determine which digitizer (e.g., make/model) is generating the touch signals and then configure itself accordingly. In this way, the stylus pen can configure itself using signals generated by the digitizer that are for a purpose that is independent of communication with the stylus pen. Additional self-configuration can include configuring stylus components that are supported by the digitizer. For example, the stylus pen can configure Bluetooth, if supported by the digitizer. Otherwise, if the digitizer does not support Bluetooth, then such functionality can be switched off in the stylus to conserve power.

The foregoing and other objects, features, and advantages will become more apparent from the following detailed description, which proceeds with reference to the accompanying figures.

DETAILED DESCRIPTION

Overview

A stylus pen is disclosed that can detect touch signals from a digitizer and dynamically determine which digitizer (e.g., make/model) generated the touch signals. The stylus pen can then switch to one of a plurality of candidate protocols, without interaction from the user, so as to communicate with the digitizer. The digitizer need not explicitly communicate what protocol it supports to the stylus pen. Rather, the stylus pen analyzes the digitizer waveforms and compares the waveforms to known signatures to determine which digitizer is being used. The stylus pen can then dynamically set a protocol used to communicate with the digitizer that matches the protocol expected by the digitizer. Setting the protocol can impact the waveforms generated by the stylus pen. For example, transmit and receive time slots can conform to the selected protocol, as well as the transmit modulation. Finally, the stylus pen can enable components that are supported by the selected protocol or the specific digitizer. For example, a Bluetooth backchannel can be established or other sensors on the stylus can be activated.

Figure 1:
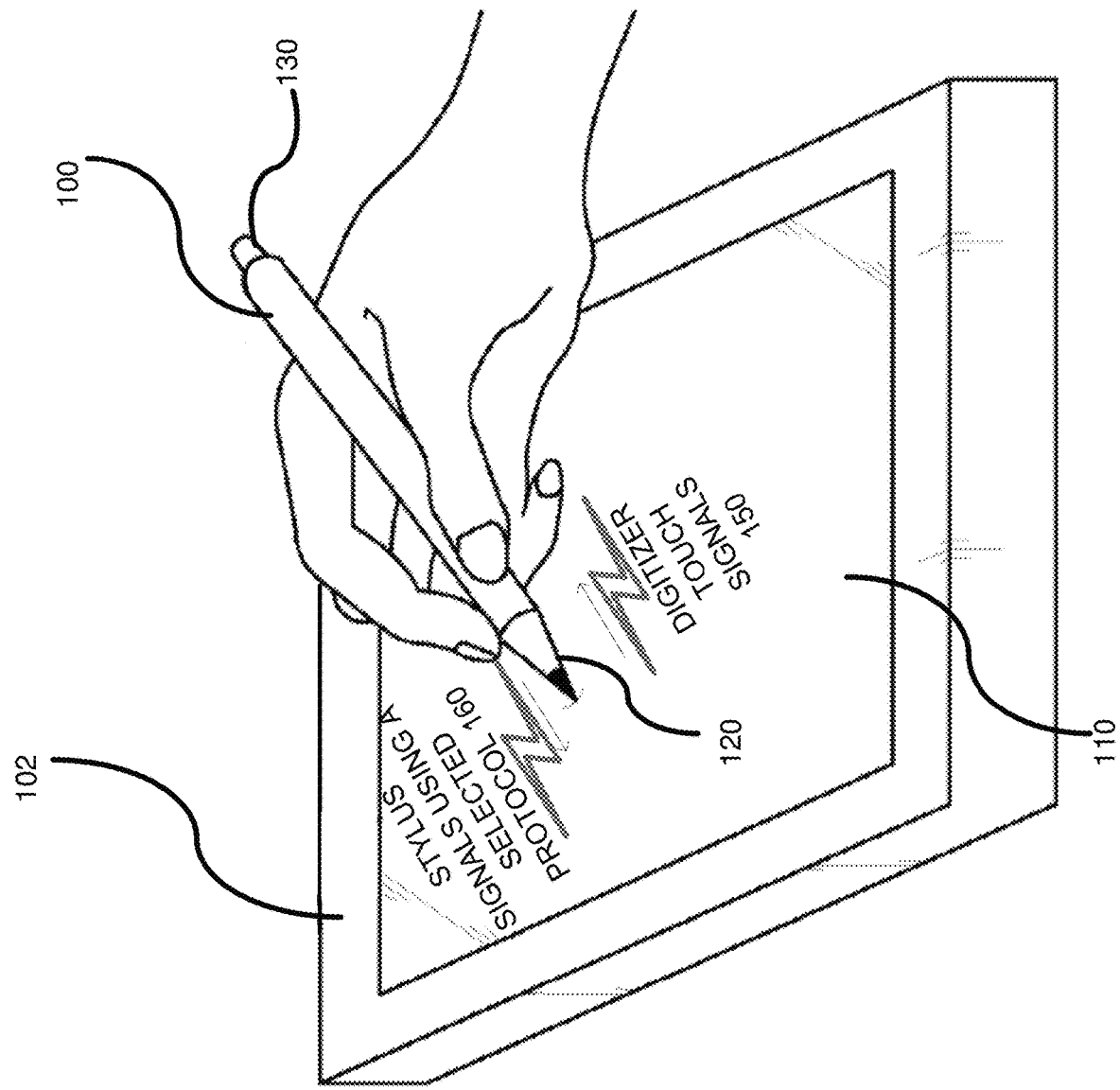
FIG. 1 is an embodiment showing a stylus pen writing on a computing device including a digitizer.

FIG. 1 is a diagram showing a stylus pen 100 in communication with a computing device 102, which includes a digitizer. The digitizer converts analog signals into digital signals. For example, user interface actions, such as presses, swipes on a touch screen 110 are converted to digital signals to allow a user to write, erase, or move content displayed on the touch screen. The stylus pen 120 typically includes a first end 120, called a stylus tip, for writing content and a second end 130 for performing a digital erasure of the content. As further described below, the stylus pen tip 120 and/or eraser end 130 transmit signals to the computing device 102 so as to operate as a user input device. Although a stylus pen is disclosed, the circuitry described herein can be inserted into other input device types (e.g., mouse, puck).

The digitizer generates touch signals 150 that are used to detect whether a user is touching the touch screen 110. The stylus pen 100 can passively monitor the digitizer touch signals and, in response thereto, determine which protocol to use to communicate with the computing device 102. Once a protocol is selected, the stylus pen can send signals 160 to the digitizer to communicate with the digitizer. The signals 160 can include stylus data, such as a stylus serial number, stylus pressure data related to how much pressure is being received by the stylus pen tip 120 touching the screen 110, a stylus manufacturer identifier, stylus button state data, stylus battery life data, stylus IMU data, etc. Other stylus data can also be included. As further described below, the stylus pen 100 can determine which digitizer (e.g., which make/model) is generating the touch signals through direct comparison of the touch signal characteristics to known characteristics of different digitizers. Once the digitizer is identified, the stylus pen can used stored configuration data associated with that digitizer to configure itself. The stylus pen can store multiple sets of configurations, for example one for each digitizer make/model, although a single make/model can be associated with more than one set of configurations, as some digitizers are designed to change behavior.

Example Digitizers

Figure 2:
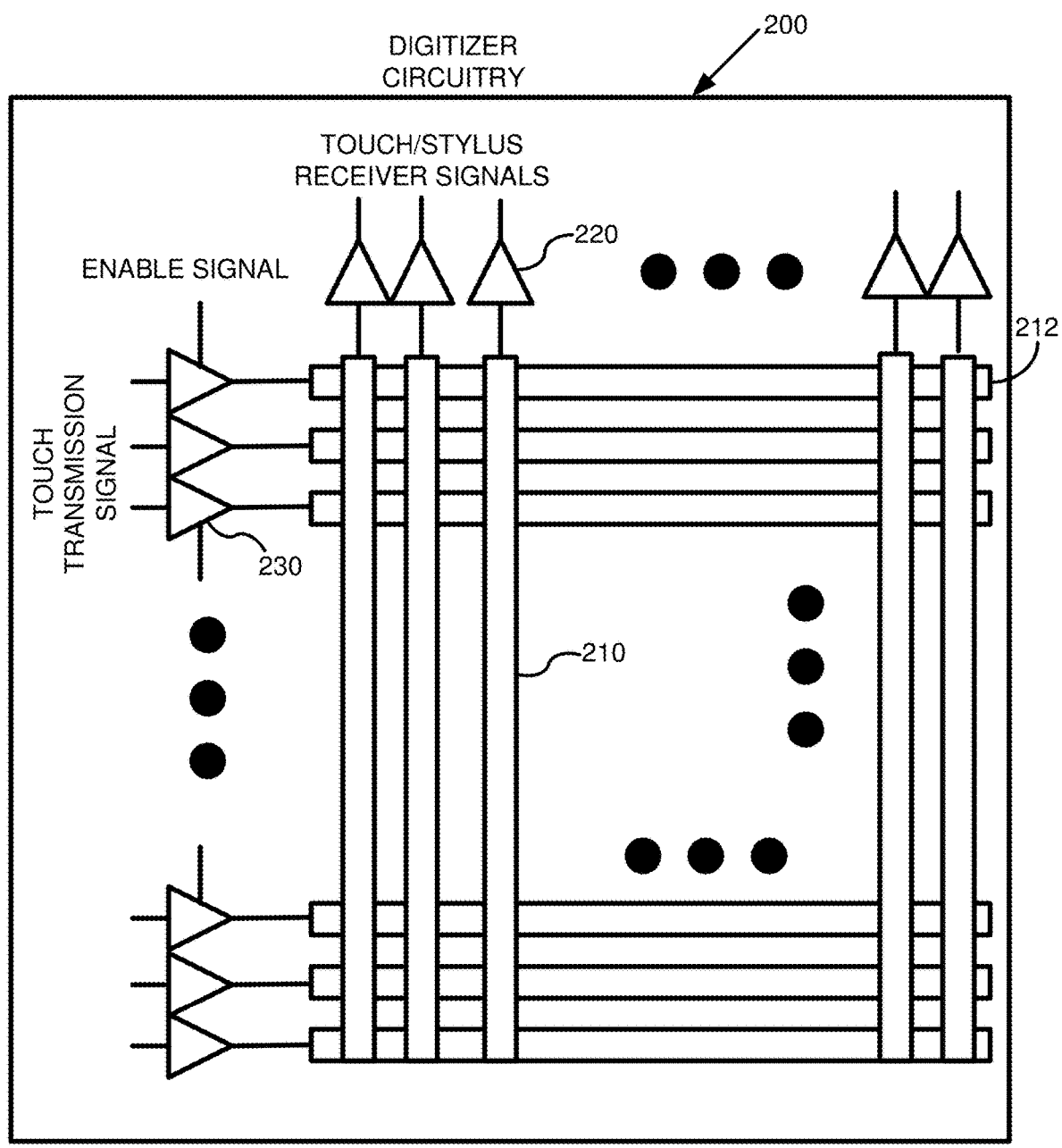
FIG. 2 shows an embodiment of a digitizer including multiple rows and columns of electrodes used to transmit and receive touch data.

FIG. 2 shows a digitizer circuit 200 that is known in the art. The digitizer circuit 200 includes a plurality of electrodes including column electrodes 210 and row electrodes 212. The columns are positioned above the rows with a gap there between so as to form a capacitance between each column and row. The capacitance between the columns and rows of electrodes changes when a finger comes in contact with a surface of the digitizer. A plurality of receiver circuits 220 can be used to sense the changing capacitance, which indicates a location of the user's finger on the digitizer. The digitizer 200 further includes a plurality of transmitters 230, one per row of electrodes 212, for transmitting touch signals on the electrodes in a scanned pattern. The transmitted touch signals are received on the column receivers 220 so as to detect any change in capacitance. The column electrodes 210 can also receive stylus pen signals when the stylus pen is brought in contact with the digitizer surface. A location of the stylus pen can be determined based on which column electrode 210 is receiving the strongest stylus signal.

Figure 3:
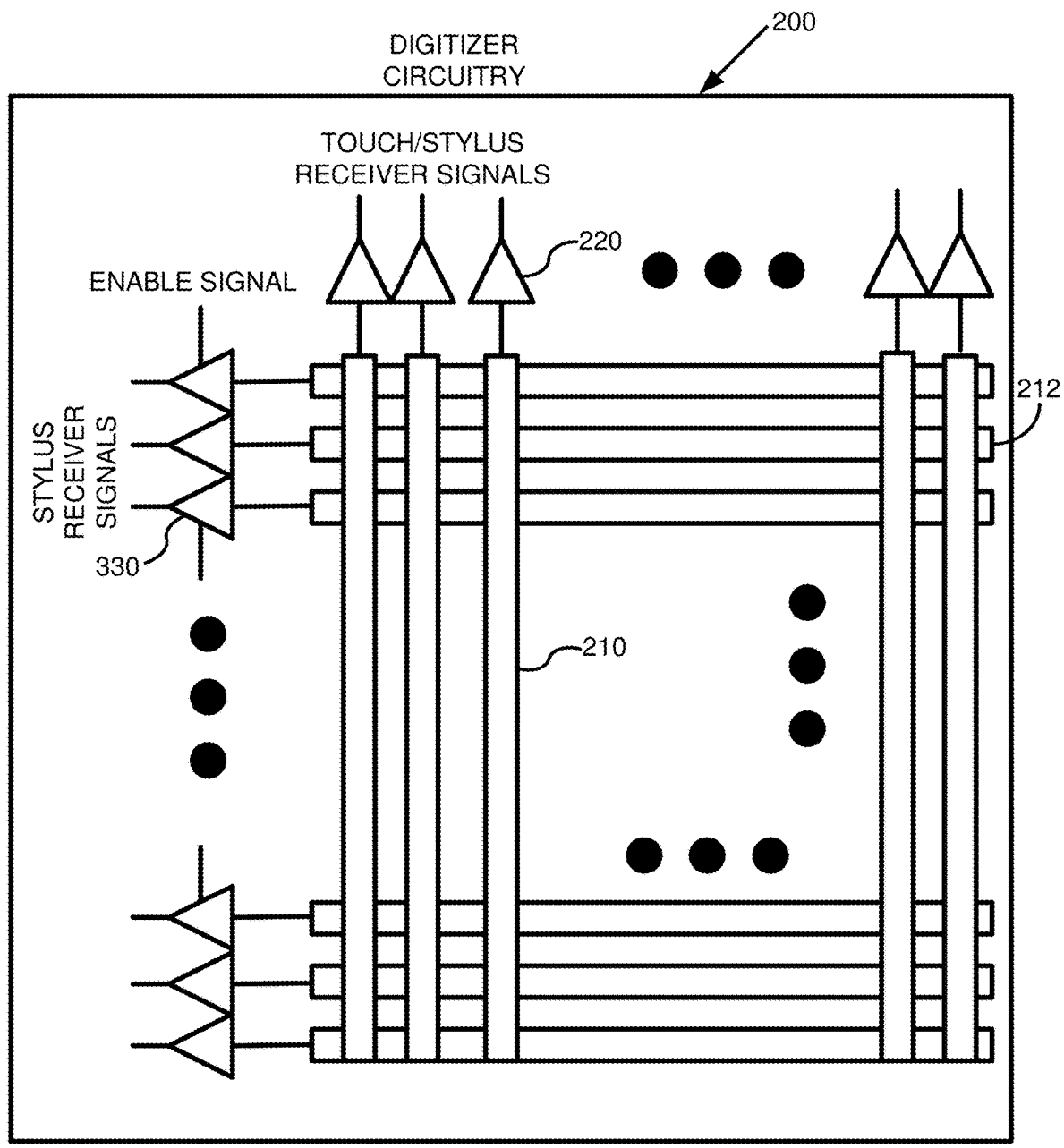
FIG. 3 is another example of a digitizer wherein both the columns and rows of electrodes are used to receive stylus signals.

FIG. 3 shows another known mode of the digitizer circuit 200, wherein the digitizer is configured for stylus processing. This mode also uses multiple columns 210 of electrodes and rows 212 of electrodes. The digitizer circuit 200 also includes receiver circuits 220 coupled to the columns of electrodes 210 so as to measure capacitance changes between the rows and columns of electrodes. In this mode, the rows of electrodes also include receivers 330 for receiving stylus signals received on the rows of electrodes 212. The digitizer 200 can switch between both modes shown in FIGS. 2 and 3.

FIGS. 2 and 3 show general configurations of a digitizer, but most, if not all, manufacturers of digitizers use different protocols in order to communicate with a stylus pen, although manufacturers can use the same protocol. Depending on the protocol used, a wide variety of signal characteristics can be changed. For example, the selected protocol can dictate voltage levels, operating frequencies, modulation types and bit assignments. If a stylus pen were to send signals that do not comport with the digitizer protocol, then communication between the stylus and the digitizer cannot be established.

Example Stylus Pen Circuits

Figure 4:
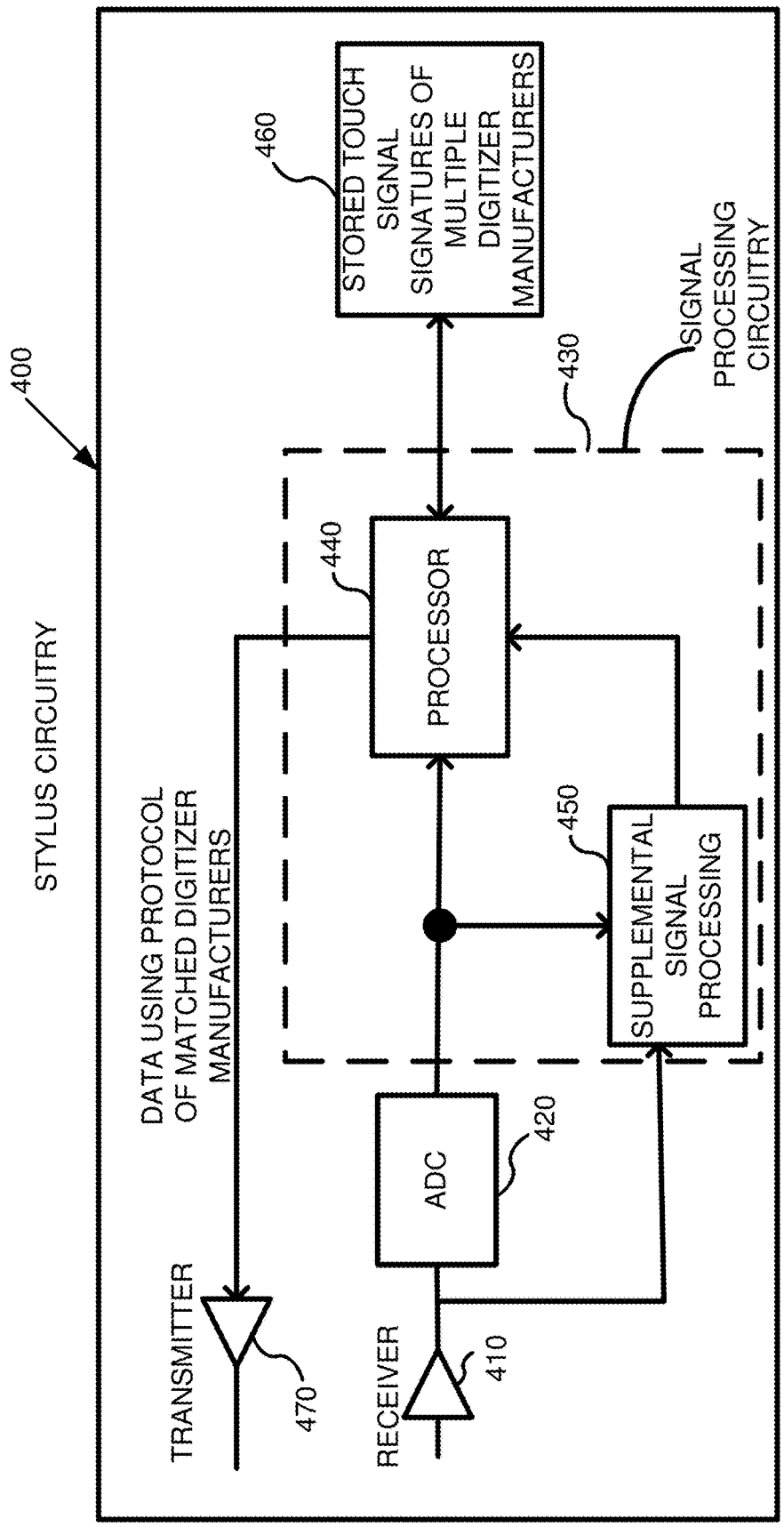
FIG. 4 is an embodiment of a circuit used within the stylus pen that includes signal processing circuitry for analyzing touch signals generated by the digitizer.

FIG. 4 shows a first embodiment of stylus pen circuitry that can be used to analyze a digitizer's touch signals and dynamically modify a protocol used in order to communicate with the digitizer. The stylus circuitry 400 includes a receiver circuit 410 configured to receive wireless touch signals in analog form from a digitizer (not shown), which is positioned near the stylus pen. An Analog-to-Digital Converter (ADC) 420 is coupled to an output of the receiver in order to convert the analog touch signals to digital for processing by the stylus circuitry 400. The output of the ADC is coupled to the signal processing circuitry 430 that includes a processor 440 (which can be a general processor, an ASIC, or a microcontroller) and any desired supplemental signal processing circuitry 450. The processor 440 is coupled to the supplemental signal processing circuitry 450 such that the processor 440 can receive a variety of different data related to the characteristics of the touch signals received from the digitizer. The supplemental signal processing 450 can also be directly coupled to the receiver 410 so that the supplemental signal processing 450 can process the amplified signal directly without needing the ADC. As further described below, the characteristics received from the ADC 420 or the receiver 410 can relate to either time-based or frequency-based characteristics of the touch signals including rise times of the touch signals, pulse characteristics of the touch signals, frequency characteristics of the touch signals, etc. The signal processing circuitry 430 can be coupled to a memory 460 (e.g., RAM, and ROM) that stores touch-signal signatures associated with multiple digitizer manufacturers, models or configurations. For example, either time-based or frequency-based characteristics can be stored within the memory 460 so as to generate a unique signature of each type of digitizer supported by the stylus pen. In a simple example, a digitizer can generate touch signals that have a particular spacing between pulses that differs from other digitizers. Such information can be stored in the memory 460 and used as data to compare against the received touch signals by the processor 440. Based on the comparison, the processor 440 can make a determination of which protocol to use in order to communicate with the digitizer.

More specifically, the processor 440 can determine a make and model of the digitizer using the stored signature and retrieve from the memory 460 a plurality of parameters associated with a protocol to use. The processor 440 can then communicate with the digitizer via a wireless transmitter 470 using the selected protocol. Generally, the processor 440 transmits data (such as stylus-related data) to the digitizer using the protocol. For example, the stylus-related data can include a serial number of the stylus, pressure data, the state of any buttons on the stylus, battery level data, and IMU data. Thus, the stylus circuitry 400 is configured to dynamically monitor digitizer touch signals and analyze those touch signals so as to determine a digitizer type. Furthermore, the stylus circuitry 400 is configured to modify the protocol used by the stylus circuitry 400 for transmitting data to the digitizer so as to match the digitizer's protocol.

Figure 5:
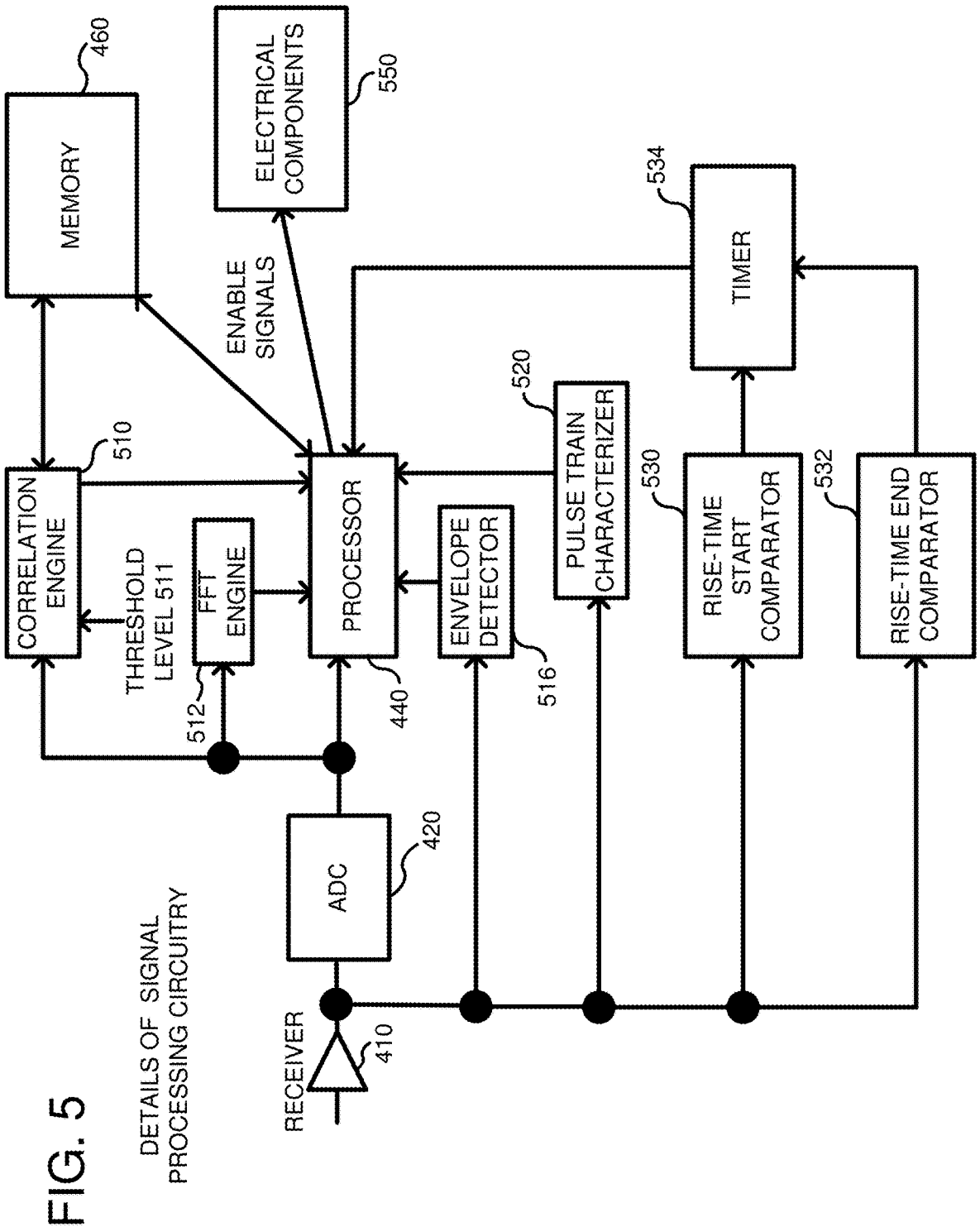
FIG. 5 shows an embodiment of the stylus pen including additional signal processing circuitry that can be used in order to analyze touch signals from the digitizer.

FIG. 5 shows further details of the signal processing circuitry 430 from FIG. 4. The receiver 410 and ADC 420 (from FIG. 4) are repeated for clarity. The receiver 410 receives touch signals from a digitizer as previously described. Those touch signals are converted to digital by the ADC 420. The output of the ADC can be supplied to multiple different hardware and/or software components used to perform signal processing on the touch signals. For example, the processor 440 itself can perform some or all of the signal processing that is shown as performed by other components. Other components can be coupled directly to the receiver 410 without passing through the ADC. A correlation engine 510 is coupled to the output of the ADC 420. The correlation engine 510 correlates data between the detected touch signals and signatures that are stored in the memory 460 of the stylus pen. The correlation engine 510 can perform a variety of correlation-type functions, such as comparing points in the received wave form to points in the stored wave form in order to detect a similarity between the wave forms. If the similarity exceeds a threshold level 511, then the correlation engine determines that a match is found. The threshold level 511 can be based on a constant or can be programmed by the user. In a simple example, the correlation engine 510 can perform the following function: $C = \Sigma_{n=1}^{N} X(n)Y(n)$, wherein X(n) is the expected wave form and Y(n) is the received wave form. The correlation function performs a point-to-point multiplication and adds the result to generate the correlation output C. The higher the output of the correlation function, the more likely that the two functions are correlated. If the correlation function output exceeds the threshold level 511, then the touch signal is determined to match the signature in memory.

A Fast Fourier Transform (FFT) engine 512 can be used in addition to the correlation engine 510 or as an alternative to the correlation engine. The FFT engine 512 receives the touch signals from the ADC 420 and performs frequency analysis on the touch signals. In particular, as described further below, different manufacturers can have different frequency spectrums associated with their touch signals. For example, some vendors may use different frequencies, implying their respective FFTs will have dominant peaks in different locations. In some cases, the FFT engine may also be used to distinguish between digitizers operating at the same fundamental frequency, if their harmonics have different amplitudes (e.g., due to drivers with different slew rates). The FFT output can be passed to the processor 440, which can compare the output from the FFT engine 512 to signature frequency data stored in the memory 460. Based on the comparison, an identification of the digitizer can be made.

An envelope detector 516 can be coupled to the output of the receiver 410 to perform envelope analysis on the input touch signals. The envelope detector 516 can track peaks in the input touch signals and, depending on a time constant, can either track individual peaks of a series of pulses or of a general shape of the series of pulses. The output of the envelope detector 516 can be passed to the processor 440 for analysis. In particular, the processor can compare various pulse characteristics determined by the envelope detector 516 with stored pulse characteristics within the memory 460. If the pulse characteristics match, the processor can use the memory 460 to retrieve the digitizer's make and model. Specifically, the data record within the memory 460 can store both the digitizer's make and model with the signature data associated with the digitizer so that when a signature is matched, the make and model can be retrieved. Additionally, the same data record can store information associated with a protocol to use with the digitizer. The information can be individual parameters or configuration settings.

A pulse train characterizer 520 can be coupled to the receiver 410 in parallel with the correlation engine 510, the Fast Fourier Transform engine 512 and the envelope detector 516. The pulse train characterizer 520 can include timers and comparators used to measure pulse width, pulse train length, and the pulse train period. Such characteristics of the pulses or combinations of pulses that make up the touch signals can be used as a signature to detect the type of digitizer generating the touch signals. Other pulse-related characteristics can be used, such as a number of pulses, an amplitude of the pulses, and a length of gaps between pulses.

The signal processing circuitry can further include a rise-time start comparator 530, a rise-time end comparator 532, and a timer 534. The rise-time start comparator 530 and rise-time end comparator 532 are coupled in parallel to the receiver 410 for receiving the touch signals. As soon as a first pulse of a touch signal is received, the rise-time start comparator starts the timer 534, such as on a rising edge of the pulse. When the pulse reaches its maximum amplitude, the rise-time end comparator 532 turns off the timer 534 so that the timer accurately reflects a rise time of the pulses associated with the touch signals. The timer output can be coupled to the processor 440 which can then compare the rise time to stored rise times in the memory 460. As a result, the rise times represent a signature of the touch signals that can be compared to known signatures stored in memory for identifying the manufacturer, model or configuration of the digitizer.

Using one, multiple or all of these various signal processing components, the processor can identify which digitizer generated the touch signals that were received on the receiver 410. The processor can then select a protocol that is suitable for communication with the detected digitizer and can further enable electrical components 550 on the stylus pen. The electrical components can be a variety of different components and/or features that may only be supported by a specific protocol or manufacturer, such as Bluetooth or other sensors on the stylus. Although not shown, the processor can control enable signals to selectively enable one or more of the supplemental signal processing circuits, including the correlation engine 510, the FFT engine 512, the envelope detector 516, the pulse train characterizer 520 and the rise-time components 530, 532, and 534.

For example, the processor can choose to enable additional components if additional information is needed to disambiguate different digitizer signatures, or if electrical noise requires more robust features to be determined. For example, an FFT requires more power than an envelope detector, but provides different information and is more robust to noise. On an environment with low noise, the envelope detector may be used to provide a first determination of the digitizer make/model. If the measured envelope is representative of more than one digitizer, an FFT could be used to resolve the ambiguity. Alternatively, on an environment with high noise and interference, the system may choose not to use the envelope detector at all, and use more noise-robust methods such as FFTs and correlations. Some signal processing circuits may not require an ADC, allowing the ADC to also be powered off, using an enable signal (not shown) coupled to the processor.

Figure 6:
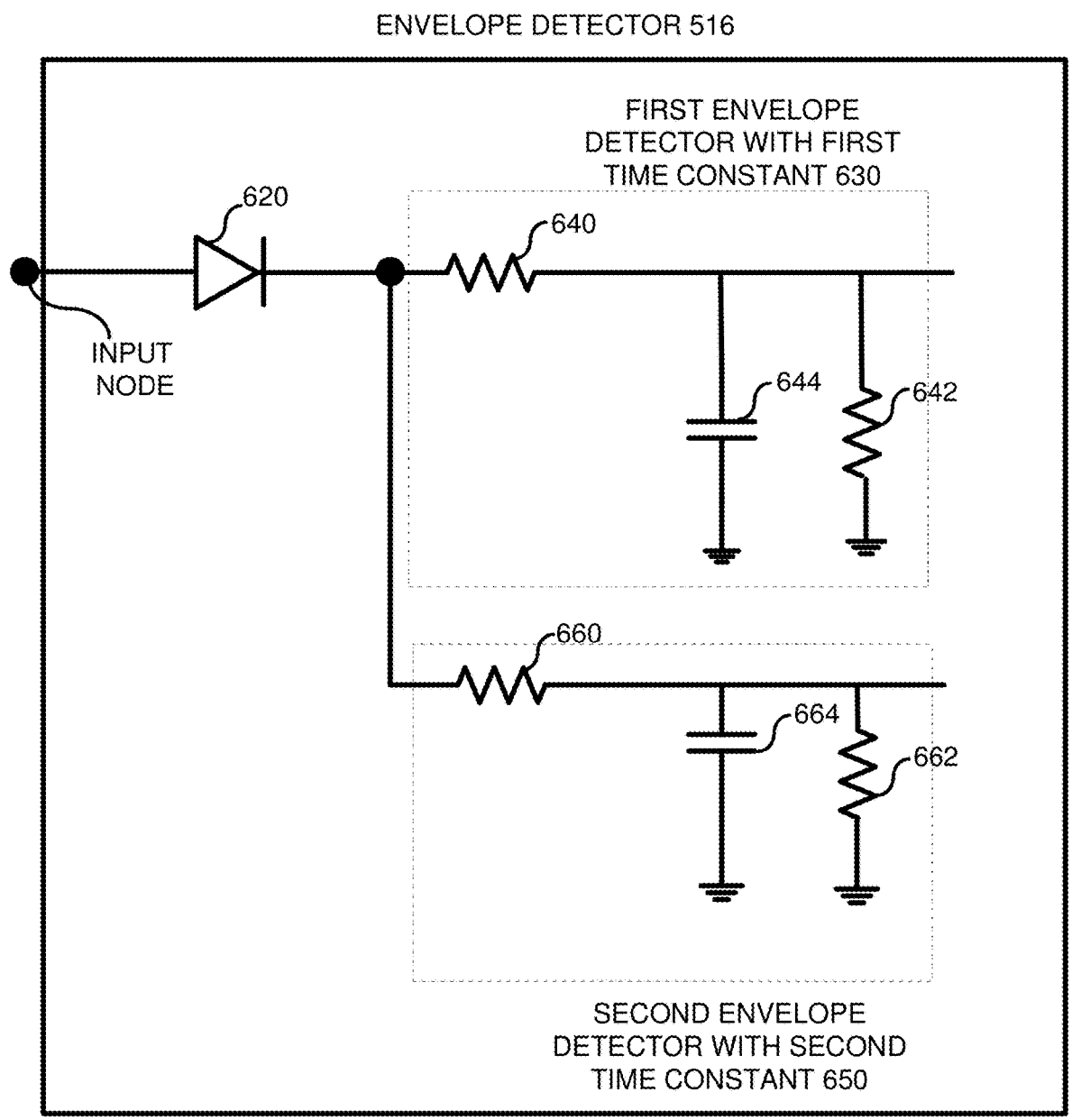
FIG. 6 shows an embodiment of an envelope detector that can be used to analyze the touch signals.

FIG. 6 provides further details of the envelope detector 516 of FIG. 5. The envelope detector 516 can include an input diode 620. A first envelope detector portion 630 can have a first time constant associated therewith. The time constant is dictated by resistors 640, 642 and capacitor 644, the values of which can be based on the particular design. A second envelope detector 650 can be positioned in parallel with the first envelope detector 630, such that both receive the same signal. The second envelope detector 650 can have a similar structure to the first envelope detector in that it includes a first resistor 660 coupled in series with a parallel combination of resistor 662 and capacitor 664. The time constant of the second envelope detector 650 is smaller than the time constant of the first envelope detector so that the second envelope detector can track individual pulses while the first envelope detector tracks group of pulses. Alternatively, the second envelope detector can be designed to track pulse trains without tracking individual pulses, while the first envelope detector responds very slowly and tracks the average level of the input signal. The values of the time constants depend on the particular design, but are controlled through selection of the individual resistor and capacitor values. The resultant output of the envelope detector provides different pulse-based characteristics of the touch signals.

Figure 7:
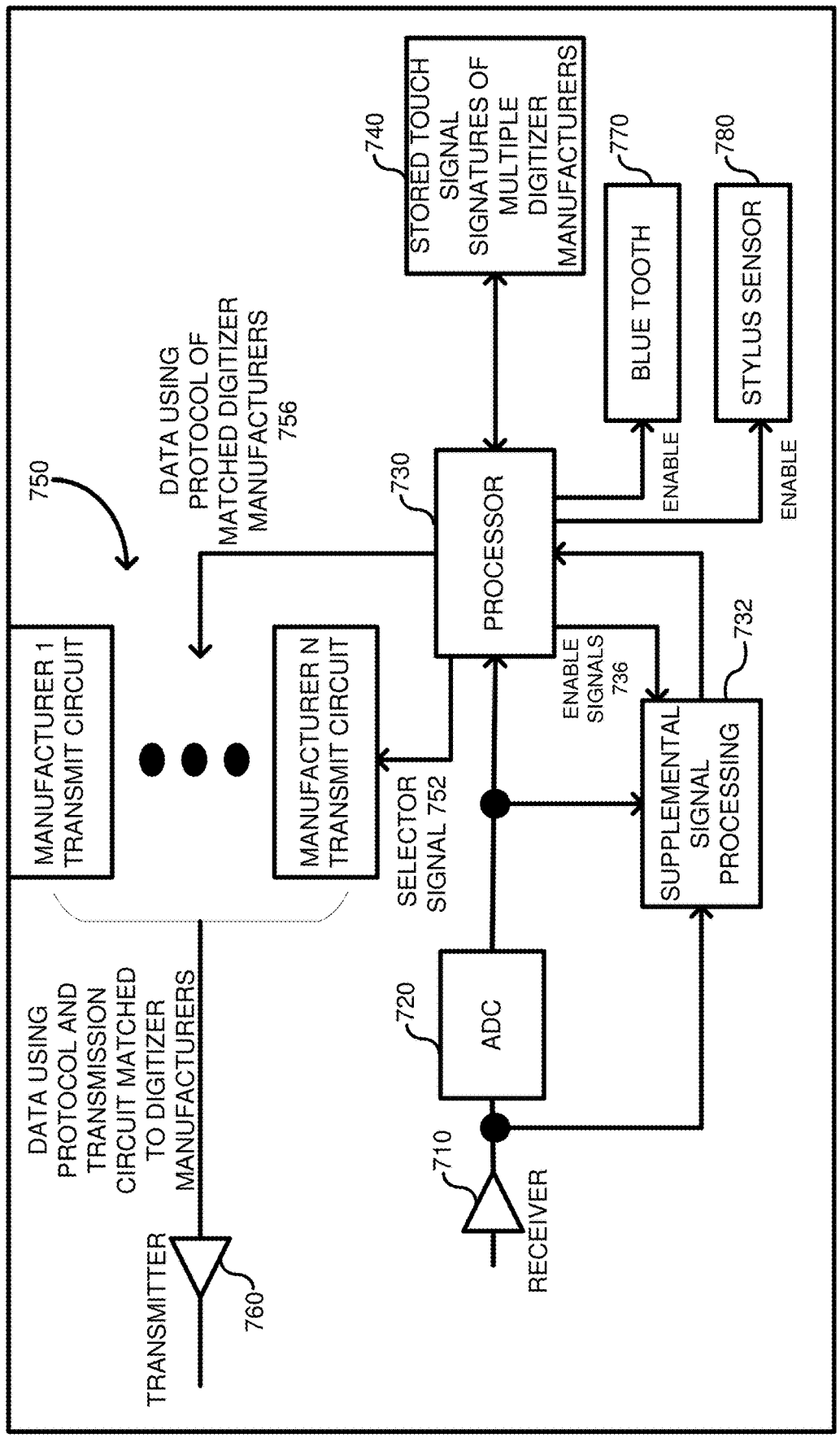
FIG. 7 shows an embodiment of circuitry used in the stylus pen for selecting one of multiple transmit circuits based on the type of digitizer.

FIG. 7 shows another embodiment of hardware within the stylus pen that can be used to identify a digitizer type and to modify a protocol used based on the type. The stylus pen can include a receiver circuit 710 used to detect digitizer touch signals. The receiver is coupled to an ADC 720 that converts the analog touch signals from the receiver to digital touch signals. The digital touch signals are then passed from the ADC 720 to a processor 730 for analysis. Additionally, the digital touch signals can be passed from the ADC 720 or the receiver 710 to supplemental signal processing 732, having one or more engines or components, such as shown in FIG. 5, each of which is individually enabled using enable signals 736. The output of the supplemental signal processing 732 is passed back to the processor for analysis. As previously described, the processor 730 executes software for analyzing the touch signals to extract characteristics of the signals. Some characteristics include amplitude, frequency, modulation types, pulse spacing, pulse width, etc. Other characteristics can be used. The processor 730 is coupled to a memory 740 that stores the touch signal signatures of multiple digitizer manufacturers, models or configurations. For example, a first manufacturer can have touch signals having pulse trains with 8 consecutive pulses with a particular spacing between the pulses, while a second manufacture has pulse trains with 10 consecutive pulses with a different spacing. Such characteristics represent the signature of the touch signal and multiple signatures can be stored in the memory 740 in association with identification information of the digitizer (e.g., make and model). The processor 730 compares the processed touch signals to those stored in memory 740 to determine if there is a match. If a match is found, then the manufacturer, model or configuration of the digitizer associated with the stored signature can also be retrieved from the memory 740. Based on the manufacturer, model or configuration, the processor 730 can select one of multiple transmit circuits 750 using a selector signal 752. Each of the transmit circuits can be associated with a different digitizer so as to match the digitizer's protocol. The transmit circuits 750 can be different from one another in a number of electrical characteristics including drive strength (voltage and maximum allowable capacitive load), slew rates/bandwidth, voltage generation method (e.g., inductive boost, oscillator, push-pull, linear amplifier). The processor 730 can also configure a state machine executed by the processor to generate waveforms specific to the identified protocol. For example, the state machine can dictate transmit and receive time slots and transmit modulation (e.g., PSK, FSK, CDMA, OOK). In this way, the processor 730 can output data using the protocol of the matched manufacturer, as indicated at 756.

A transmitter 760 transmits data supplied from the selected transmit circuit 750. The data is in conformance with the protocol used by the digitizer. Although only one transmitter is shown, the circuit can be easily modified to include multiple transmitters, one per transmit circuit 750. The processor 730 can further enable components on the stylus pen, such as a Bluetooth component 770 and/or a stylus sensor 780. Other components can be used. Thus, the processor can detect and determine the digitizer manufacturer, model and/or configuration and then configure itself dynamically to be compatible with the digitizer.

Example Touch Signals and Analysis of Characteristics Thereof

Figure 8:
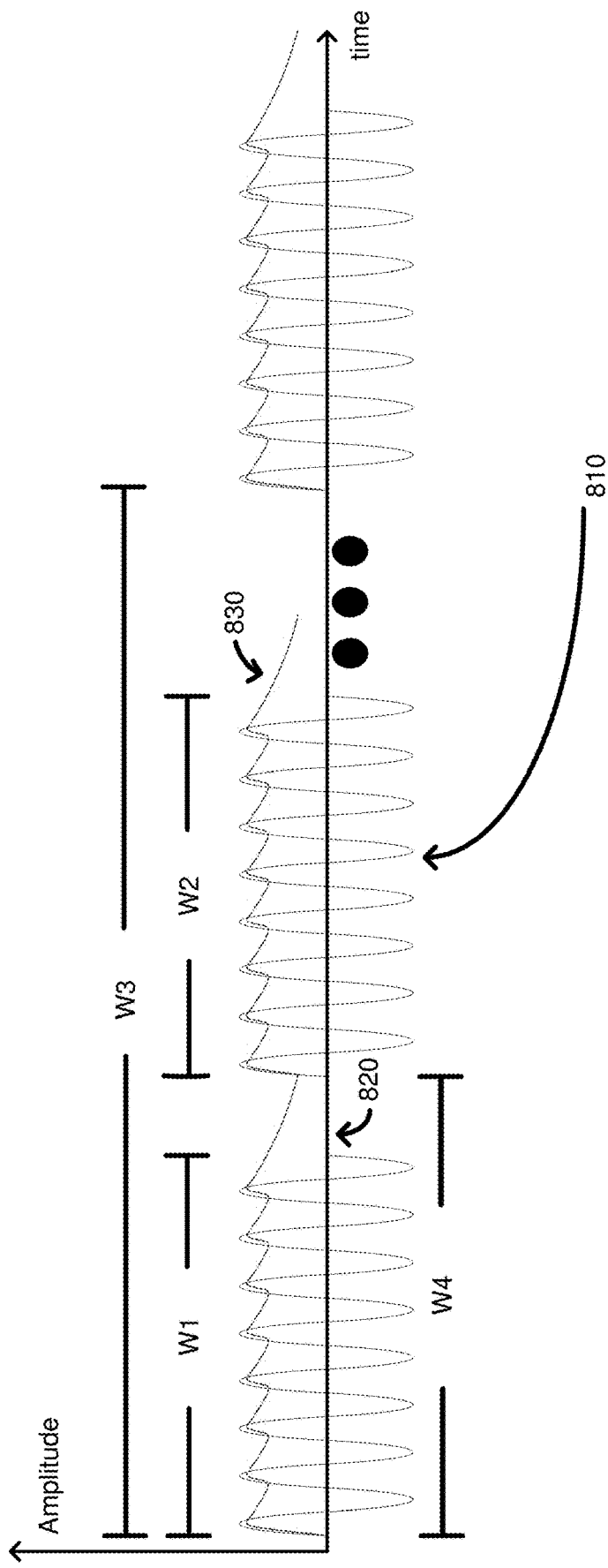
FIG. 8 is an embodiment showing example received touch signals and different characteristics of the touch signals that can be analyzed.

FIG. 8 shows example touch signals generated by a digitizer and received by a stylus pen in any of the embodiments described herein. The touch signals 810 are shown as having a sinusoidal waveform with frequency F and are received in multiple bursts. A first burst includes a wave having a width W1. A second burst includes a wave having a width W2. A gap 820 spaces the first burst from the second burst. An envelope 830 produced by a possible envelope detector is also shown. A measurement W4 indicates a length from the start of the first burst to the start of the second burst. At a time delay that is larger than the gap 820, a third burst is received, such that the start of the first burst to the start of the third burst is measured by W3. The measurements W1, W2, W3, and W4 represent a signature of the waveform that can be compared to stored measurements to determine if a match exists. If a match is made, then the protocol is identified and stored protocols on the stylus pen can be used to communicate with the digitizer. The signal processing components of FIG. 5 can be used to determine F, W1, W2, W3, and W4, through using the envelope detector 516 and/or pulse train characterizer and/or FFT engine.

Figure 9:
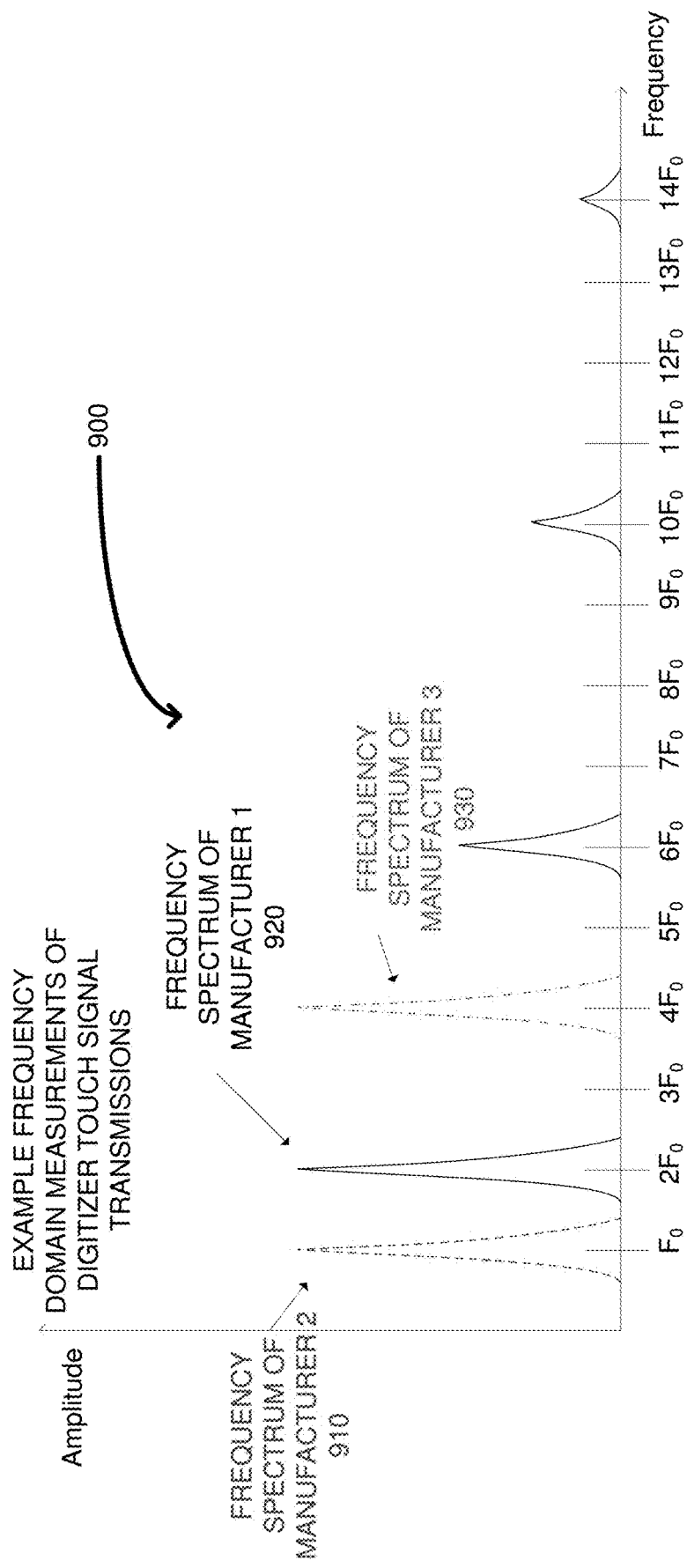
FIG. 9 is an embodiment showing different frequency characteristics of the touch signals that can be used to identify a particular manufacturer, model or configuration of digitizer.

FIG. 9 shows a frequency domain representation 900 of the received touch signals from multiple digitizers to illustrate the difference between the manufacturers in terms of the frequency signature. The frequency domain representation can be generated by passing the touch signals through a FFT, as previously described. At 910, a manufacturer 2 has a single component at frequency $F_0$, implying a digitizer with sinusoidal excitation. Manufacturer 1 has frequency spectrum 920 with a fundamental at $2F_0$ and its odd harmonics, implying a rectangular wave. Manufacturer 3 has a single component at frequency $4F_0$, as shown at 930, implying a sinusoidal excitation. These different frequency characteristics can be used to compare against known signatures for the manufacturers so as to determine which manufacturer generated the touch signals.

Figure 10:
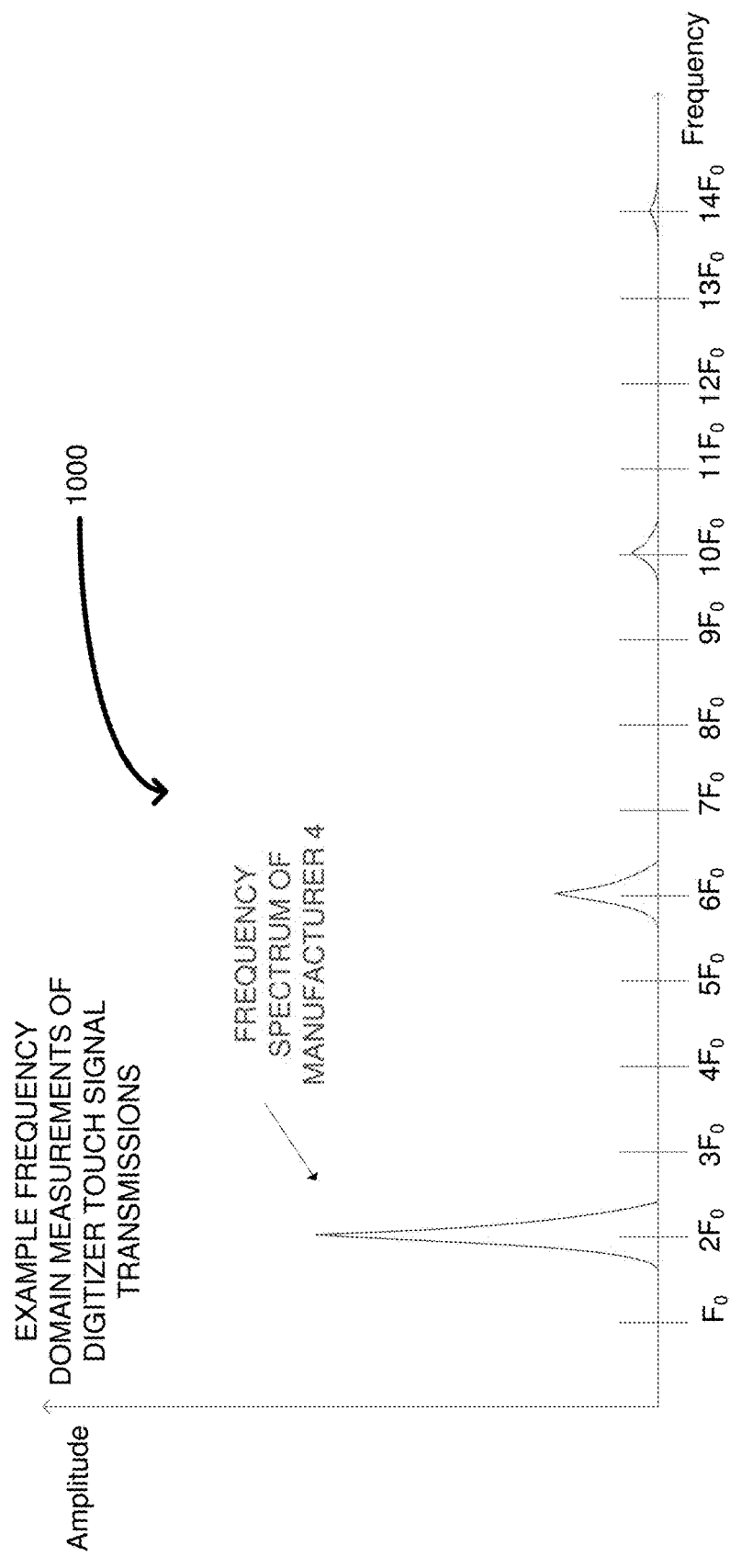
FIG. 10 is an additional diagram illustrating frequency measurements of the digitizer touch signal transmissions in order to identify a manufacturer, model or configuration of the digitizer.

FIG. 10 shows another frequency domain representation 1000 having manufacturer 4. Notably, manufacturer 4 has a fundamental at $2F_0$ and its odd harmonics. It is distinguished from manufacturer 1 of FIG. 9 by having different amplitudes associated with the harmonics. Indeed, the components of manufacturer 4 decay faster with increasing frequency, suggesting a system construction with more limited bandwidth (e.g., due to drivers with limited slew rates or more resistive sensor electrodes). These differences may not be easily detectable under additive noise and interference. Consequently, a second level of analysis can be performed using any of the other techniques already described herein to differentiate one manufacturer from another.

Figure 11:
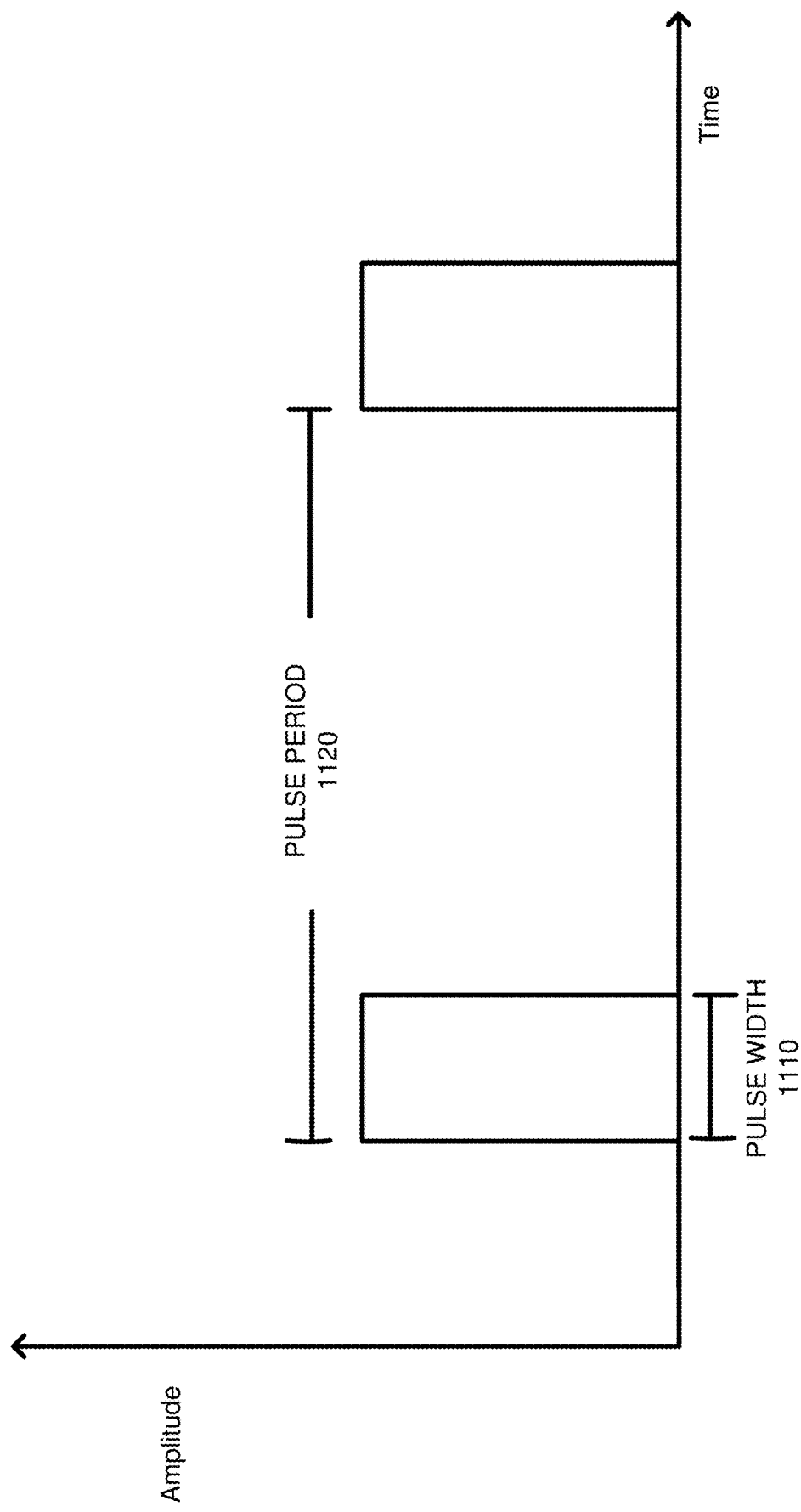
FIG. 11 shows additional parameters that can be measured in association with the touch signals in order to determine the digitizer type.

FIG. 11 shows still further examples of a touch signal waveform containing a square pulse. Notably, the shape of the signal can also be a characteristic that can be used to determine the manufacturer. Still further, the pulse width 1110 and the pulse period 1120 can be used to identify the manufacturer. Virtually any desired characteristics of the touch signal waveforms can be used to distinguish one manufacturer from another.

Figure 12:
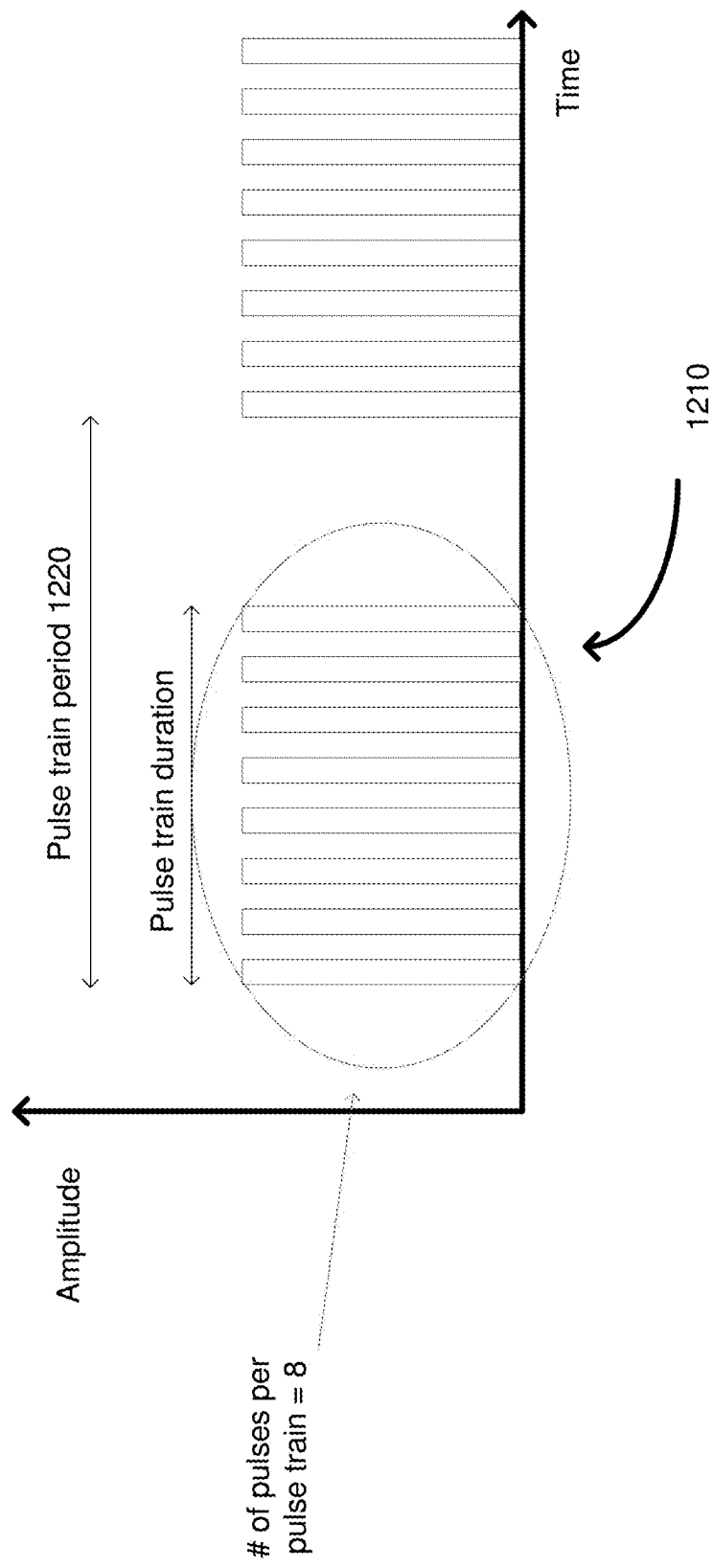
FIG. 12 shows still further touch signal characteristics that can be measured in order to determine the digitizer type.

FIG. 12 shows further characteristics of the touch signals that can be used to identify a manufacturer. In this case, a pulse train 1210 includes 8 pulses closely spaced, followed by a gap and then another burst of 8 pulses. The overall period 1220 can further be used to characterize the touch signals so as to identify a manufacturer. Any characteristics of the touch signals can be used including a number of pulses in a burst and the pulse train period. Such characteristics can be determined by the processor or other signal processing circuitry already described.

Embodiments of Methods

Figure 13:
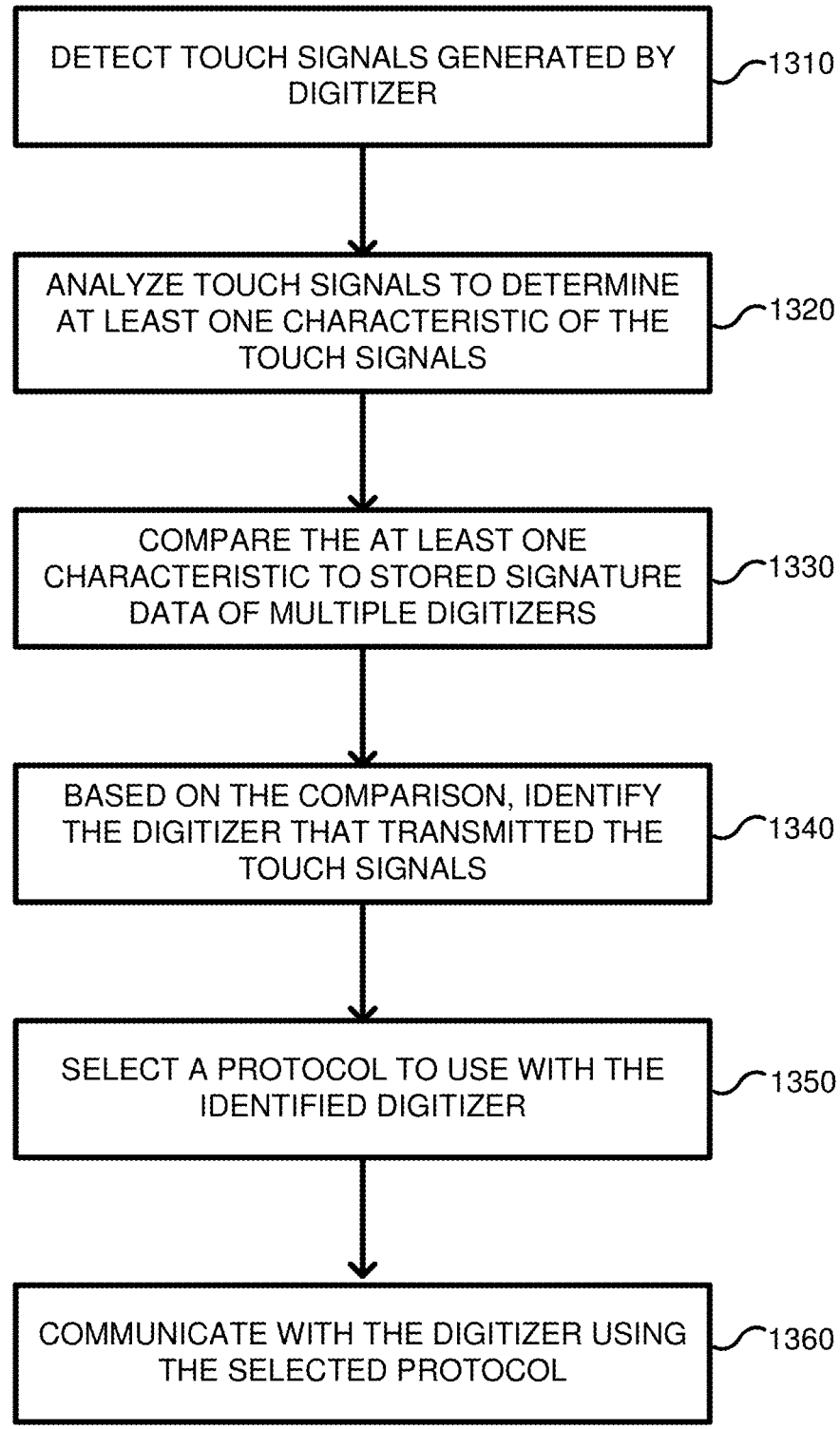
FIG. 13 is an embodiment of a flow chart for identifying a digitizer and selecting a protocol to use with the identified digitizer.

FIG. 13 is a flowchart of a method for communicating between a stylus pen and a digitizer. The method of FIG. 13 may be performed by the stylus pen. In process block 1310, touch signals can be detected that are generated by a digitizer. For example, a stylus receiver circuit (e.g., including an electrode) can be used to receive the wireless transmission of the touch signals. In process block 1320, the touch signals can be analyzed to determine at least one characteristic of the touch signals. Any of the time-domain or frequency-domain characteristics can be used including any of the characteristics described above. Examples include measurements of pulse width, pulse shape, pulse period, a number of pulses, and any timing information associated with the pulses. In process block 1330, the measured or detected characteristic is compared to stored signature data for multiple digitizers. Thus, each of the multiple stored digitizers can be considered candidates for received touch signals and one of the candidates can match the characteristic of the received touch signals. In process block 1340, when a match is found between the received touch signals and the stored signature, the digitizer associated with the signature is identified as the one that produced the touch signals. For example, the memory can associate the stored signatures with the manufacturer so that identifying a signature results in identification of the manufacturer. In process block 1350, a protocol associated with the identified digitizer can be selected and used to configure the stylus pen. The configuration can include enabling a transmit circuit that produces the signals at the correct frequency, duty cycle, etc. Additionally, a state machine executing on the stylus hardware can be configured so as to produce signals in accordance with the selected protocol. In process block 1360, the stylus pen communicates with the digitizer using the selected protocol. The communication can include sending data to the digitizer, such as pressure data, identification data, state information data, battery level data, and IMU data.

As a result, the stylus pen can automatically detect which protocol is being used by the digitizer, without requiring the user to use some means (e.g., flip switches) of configuring the pen to a specific protocol. Additionally, the stylus pen detects the digitizer protocol without the digitizer specifically telling the stylus pen which protocol to use. More specifically, the stylus pen passively monitors (receive only) the digitizer touch signals as opposed to an active communication wherein an agreed upon protocol is used through cross-communication. As a result, the stylus pen is adaptable to communicate with any one of multiple digitizers of different types using multiple stored protocols, any one of which can be selected to use for the particular digitizer detected. The touch signals that are monitored are generated on rows and columns of electrodes in the digitizer and are used to detect and track fingers touching the digitizer screen. Thus, the stylus pen can configure itself using signals generated by the digitizer that are for a purpose that is independent of communication with the stylus pen. More specifically, the stylus pen can configure itself using finger touch-related data. In this way, the stylus pen can be considered a universal pen.

To measure signals produced by a digitizer, the stylus pen includes a receive electrode and a circuit containing an amplifier, ADC (analog-digital converter) and processing circuit (e.g., microcontroller or ASIC) to measure the signals generated by the digitizer and process them to produce an identification of digitizer type (e.g., make and model). This identification relies on using the processing circuit on the pen to compute specific time-domain and frequency-domain features, which can be used to discriminate the touch digitizer's identity (e.g., make, model, generation, firmware version). Examples of features are a Fourier, wavelet or other transform; a list of dominant frequencies of its spectrum and associated amplitudes; the correlation of the measured waveform with a prescribed waveform defined a priori; RMS power; rise time of transitions; waveform duty cycle, burst period, burst length, number of bursts per second, number of pulses per burst and sampling rate.

A detector algorithm targeting a single digitizer make/model can include more than a single set of operating parameters, since a touch digitizer may change its behavior depending on environmental conditions (e.g., it can do frequency hopping, change its sampling rate, change burst characteristics). Nevertheless, different manufacturers rely on different principles which can be unique, and their idiosyncrasies can be used for identification.

Figure 14:
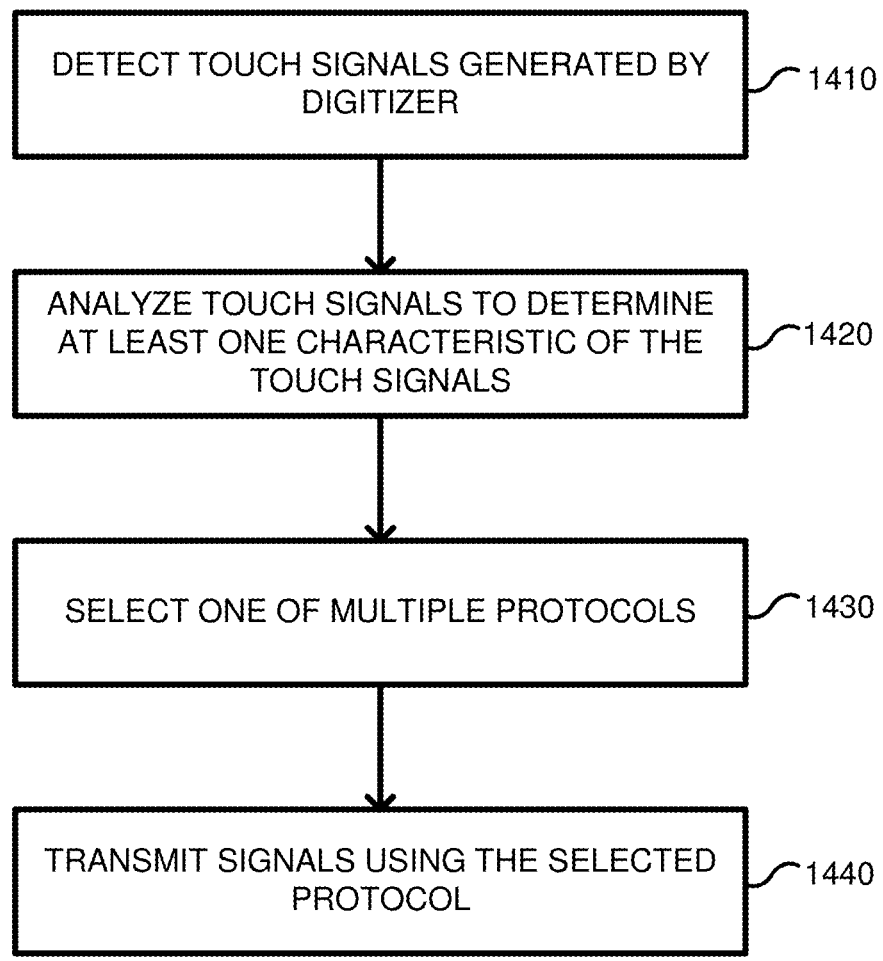
FIG. 14 is a flowchart according to another embodiment for selecting one of multiple protocols to communicate with a digitizer.

FIG. 14 is a flowchart of a method according to another embodiment for communicating between a stylus pen and a digitizer. The method of FIG. 14 may be performed by the stylus pen. In process block 1410, touch signals generated by a digitizer are detected. The touch signals can be detected by a receiver electrode positioned on the stylus pen, such as the one shown at 410 in FIG. 4. Further detection can be accomplished by an ADC 420 that automatically converts any signals to digital. A still further layer of detection can be from a processor coupled to the ADC that recognizes a signal having characteristics of a touch signal has been received and converted to digital form. In process block 1420, the touch signals are analyzed to determine at least one characteristic of the touch signals. The analyzing of the touch signals can be performed by signal processing circuitry, which can include the processor 440 of FIG. 4 and/or supplemental signal processing circuitry, examples of which are shown in FIG. 5. For example, the analyzing of the touch signals can include performing a correlation between the detected touch signals and signatures stored within the stylus pen (the signatures being associated with different digitizers). Alternatively, the analyzing of the touch signals can include performing frequency analysis on the touch signals and comparing the frequency analysis to stored characteristics of different digitizers associated with different manufacturers, models or configuration. Other forms of analyzing can be performed as described in the embodiments herein. In process block 1430, one of the multiple protocols can be selected. Selecting of the protocols includes determining a match between characteristics of the received touch signals with stored characteristics, such as having the same shape, amplitude, frequency, and/or timing. If a match is found, then the stored characteristics are also associated with a particular manufacturer, model or configuration and protocol to be used. The processor can simply use the identified protocol to configure a state machine associated with the protocol. In process block 1440, the stylus pen can transmit signals to the digitizer using the selected protocol. The transmitting of signals can include using the state machine to implement the protocol and selecting a proper transmit circuit, such as one of the transmit circuits 750 (FIG. 7) that electrically comply with requirements of the digitizer. Waveforms can be generated using the state machine and those waveforms can be transformed to the proper electrical characteristics using the transmit circuit. The transformed waveforms can then be transmitted via the transmitter 760 to the digitizer.

Computing Systems

Figure 15:
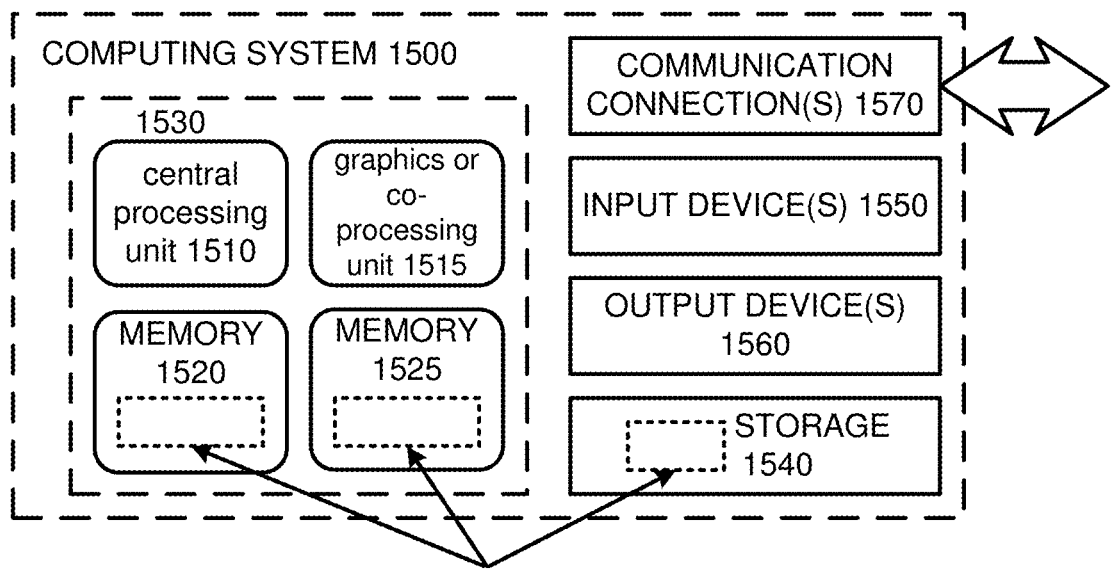
FIG. 15 is an example environment that can be used in conjunction with the technologies described herein.

FIG. 15 depicts a generalized example of a suitable computing system 1500 in which the described innovations may be implemented. One or more components of the system 1500 can be included in the stylus pen. The computing system 1500 is not intended to suggest any limitation as to scope of use or functionality, as the innovations may be implemented in diverse general-purpose or special-purpose computing systems.

With reference to FIG. 15, the computing system 1500 includes one or more processing units 1510, 1515 and memory 1520, 1525. In FIG. 15, this basic configuration 1530 is included within a dashed line. The processing units 1510, 1515 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 15 shows a central processing unit 1510 as well as a graphics processing unit or co-processing unit 1515. The tangible memory 1520, 1525 may be volatile memory (e.g., registers, cache, RAM), nonvolatile memory (e.g., ROM, EEPROM, flash memory), or some combination of the two, accessible by the processing unit(s). The memory 1520, 1525 stores software 1580 implementing one or more innovations described herein, in the form of computer-executable instructions suitable for execution by the processing unit(s).

A computing system may have additional features. For example, the computing system 1500 includes storage 1540, one or more input devices 1550, one or more output devices 1560, and one or more communication connections 1570. An interconnection mechanism (not shown) such as a bus, controller, or network interconnects the components of the computing system 1500. Typically, operating system software (not shown) provides an operating environment for other software executing in the computing system 1500, and coordinates activities of the components of the computing system 1500.

The tangible storage 1540 may be removable or non-removable, and includes any type of storage sized for stylus pens. The storage 1540 stores instructions for the software 1580 implementing one or more innovations described herein.

The input device(s) 1550 may be a touch input device that provides input to the computing system 1500. The output device(s) 1560 may be a display, speaker, or another device that provides output from the computing system 1500.

The communication connection(s) 1570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local and can include any combination of special-purpose hardware and/or general-purpose hardware with software implementing the functionality described herein.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 15, computer-readable storage media include memory 1520 and 1525, and storage 1540.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Alternative Embodiments

Various combinations of the embodiments described herein can be implemented. For example components described in one embodiment can be included in other embodiments and vice versa. The following paragraphs are non-limiting examples of such combinations:

A. A method for communicating between a stylus pen and a digitizer, comprising:

detecting, in the stylus pen, touch signals generated by the digitizer;

analyzing the touch signals to determine which of multiple protocols to use for communication with the digitizer;

based on the analyzing, selecting one of the multiple protocols; and transmitting signals from the stylus pen using selected protocol.

B. The method of paragraph A, wherein the analyzing of the touch signals includes performing a correlation between the detected touch signals and signatures stored within the stylus pen, the signatures being associated with at least two or more different digitizers.

C. The method of paragraph A or paragraph B, wherein the analyzing of the touch signals includes performing frequency analysis on the touch signals and comparing the frequency analysis to stored characteristics of different digitizers models to determine which model is associated with the touch signals.

D. The method of paragraphs A through C, wherein the transmitting of the signals from the stylus pen includes transmitting pressure data indicating a pressure measurement associated with a contact of the stylus pen with a screen of the digitizer.

E. The method of paragraphs A through D, wherein the transmitting of the signals from the stylus pen includes selecting one of a plurality of transmission circuits located on the stylus pen and transmitting data from the stylus pen over the selected transmission circuit using the selected protocol.

F. The method of paragraphs A through E, wherein the transmitting of the signals further includes configuring a state machine associated with the selected protocol.

G. The method of paragraphs A through F, further including generating waveforms associated with the selected protocol using the state machine.

H. The method of paragraphs A through G, further including identifying the digitizer based on the analyzing and, based upon a model of the digitizer, enabling electrical components on the stylus pen that are supported by the digitizer.

Alternative embodiments can be described by the following paragraphs:

A. A device, comprising:

a receiver in a stylus pen adapted to receive touch signals from a digitizer;

a processor coupled to the receiver, the processor configured to analyze the touch signals to determine which of a plurality of digitizers generated the received touch signals;

a memory coupled to the processor, the memory for storing signatures of the plurality of digitizers; and a plurality of transmit circuits coupled to the processor, the transmit circuits being individually selectable by the processor based on which of the plurality of digitizers generated the received touch signals.

B. The device of paragraph A, further including a correlation engine coupled to the processor and the memory configured to correlate the touch signals received from the digitizer and the stored signatures in the memory.

C. The device of paragraph A or B, further including first and second comparators coupled to receive the touch signals from the receiver and coupled to a timer circuit, the first comparator for starting the timer circuit upon a rising edge of one of the touch signals, and the second comparator for stopping the timer circuit at a top of the rising edge, the processor coupled to the timer circuit and configured to receive a rise time from the timer circuit and to compare the rise time to signature rise times stored in the memory.

D. The device of paragraphs A through C, further including a Fast Fourier Transform engine coupled to receive the touch signals and perform frequency analysis on the touch signals.

E. The device of paragraphs A through D, wherein the processor is configured to enable a stylus sensor compatible with the digitizer based upon a determination by the processor of which of the plurality of digitizers is associated with the touch signals.

F. The device of paragraphs A through E, further including a pulse-train characterizer coupled to the receiver and to the processor, the pulse-train characterizer configured to measure one or more of the following: a pulse period between pulses, a pulse width, a pulse train duration, or a number of pulses in a pulse train.

Still further embodiments can be described by the following paragraphs:

A. A stylus pen, comprising:

a receiver configured to receive digitizer touch signals from a digitizer; and signal processing circuitry configured to analyze the touch signals and to determine which of a plurality of digitizers transmitted the touch signals;

wherein the stylus pen is configured to select a transmission protocol from amongst a plurality of candidate transmission protocols to communicate with the digitizer based on the determination of the signal processing circuitry as to which of the plurality of digitizers transmitted the touch signals.

B. The stylus pen of paragraph A, wherein the signal processing circuitry includes a processor, and further including a memory within the stylus pen configured to store signature data for each of the plurality of digitizers.

C. The stylus pen of paragraph A or B, wherein the signal processing circuitry includes a processor and further including a plurality of transmit circuits coupled to the processor, the processor configured to enable one of the plurality of transmit circuits associated with the digitizer.

D. The stylus pen of paragraphs A through C, further including a memory coupled to the signal processing circuitry for storing a plurality of signatures associated with the touch signals from the plurality of digitizers.

E. The stylus pen of paragraphs A through D, further including a correlation engine coupled to the signal processing circuitry, the correlation engine for matching the touch signals to one of the plurality of signatures in the memory.

F. The stylus pen of paragraphs A through E, wherein the selected transmission protocol is controlled by a state machine.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A method for communicating between a stylus pen and a digitizer, comprising: detecting, in the stylus pen, touch signals generated by the digitizer;
    analyzing the touch signals to determine which of multiple protocols to use for communication with the digitizer, wherein the analyzing of the touch signals includes performing a correlation between the detected touch signals and signatures stored within the stylus pen, the signatures being associated with a plurality of different types of digitizers;
    based on the analyzing, selecting a protocol from the multiple protocols, each protocol of the multiple protocols being associated with a different type of digitizer;
    selecting a transmit circuit from a plurality of transmit circuits of the stylus pen based on the selected protocol, each transmit circuit of the plurality of transmit circuits being associated with a different type of digitizer and configured to generate signals having different electrical characteristics that are matched to the protocol associated with the different type of digitizer;
    generating, via the selected transmit circuit, signals according to the selected protocol; and
transmitting the signals from the stylus pen to the digitizer.

2. The method of claim 1, wherein the transmitting of the signals from the stylus pen includes transmitting pressure data indicating a pressure measurement associated with a contact of the stylus pen with a screen of the digitizer.

3. The method of claim 1, wherein the transmitting of the signals further includes configuring a state machine associated with the selected protocol.

4. The method of claim 3, further including generating waveforms associated with the selected protocol using the state machine.

5. The method of claim 1, further including identifying the digitizer based on the analyzing and, based upon a type of the digitizer, enabling electrical components on the stylus pen that are supported by the type of digitizer.

6. A device, comprising: a receiver adapted to receive touch signals from a digitizer;
    a processor coupled to the receiver, the processor configured to analyze the touch signals to determine a signature of the digitizer;
    a memory coupled to the processor, the memory storing a plurality of signatures each corresponding to a different type of digitizer, wherein the processor is configured to compare the determined signature with the plurality of signatures stored in the memory to determine which type of digitizer is associated with the touch signals;
    a correlation engine coupled to the processor and the memory and configured to correlate the touch signals received from the digitizer, and wherein the signature of the digitizer is based on correlation data output by the correlation engine; and
    a plurality of transmit circuits coupled to the processor, each transmit circuit of the plurality of transmit circuits being associated with a different type of digitizer and configured to generate signals having different electrical characteristics that are matched to a protocol associated with the different type of digitizer, and each transmit circuit being individually selectable by the processor based on the determined type of digitizer to generate signals according to the protocol associated with the determined type of digitizer so as to allow the device to communicate with the digitizer.

7. The device of claim 6, further including first and second comparators coupled to receive the touch signals from the receiver and coupled to a timer circuit, the first comparator for starting the timer circuit upon a rising edge of one of the touch signals, and the second comparator for stopping the timer circuit at a top of the rising edge, the processor coupled to the timer circuit and configured to receive a rise time from the timer circuit and to compare the rise time to signature rise times stored in the memory.

8. The device of claim 6, further including a Fast Fourier Transform engine coupled to receive the touch signals and perform frequency analysis on the touch signals.

9. The device of claim 6, wherein the processor is configured to enable a stylus sensor compatible with the digitizer based upon a determination by the processor of which of the plurality of different types of digitizers is associated with the touch signals.

10. The device of claim 6, further including a pulse-train characterizer coupled to the receiver and to the processor, the pulse-train characterizer configured to measure one or more of the following: a pulse period between pulses, a pulse width, a pulse train duration, or a number of pulses in a pulse train.

11. A stylus pen, comprising: a receiver configured to receive digitizer touch signals from a digitizer; and
    signal processing circuitry configured to analyze the touch signals and to determine which of a plurality of different types of digitizers transmitted the touch signals, wherein the signal processing circuitry includes a processor, and further including a memory within the stylus pen configured to store signature data for each of the plurality of digitizers, wherein the stylus pen is configured to select a transmission protocol from amongst a plurality of candidate transmission protocols to communicate with the digitizer based on the determination of the signal processing circuitry as to which of the plurality of different types of digitizers transmitted the touch signals, and wherein the selection of the transmission protocol includes selection of a transmit circuit of a plurality of transmit circuits, each transmit circuit being associated with a different type of digitizer and configured to generate signals having different electrical characteristics that are matched to a transmission protocol associated with the different type of digitizer, and wherein the selected transmit circuit is configured to generate signals according to the selected transmission protocol associated with the determined type of digitizer so as to allow the device to communicate with the digitizer.

12. The stylus pen of claim 11, wherein the signal processing circuitry includes a processor coupled to the plurality of transmit circuits, the processor configured to enable the selected transmit circuit to generate signals according to the selected transmission protocol associated with the determined type of digitizer.

13. The stylus pen of claim 11, further including a memory coupled to the signal processing circuitry for storing a plurality of signatures associated with the touch signals from the plurality of digitizers.

14. The stylus pen of claim 13, further including a correlation engine coupled to the signal processing circuitry, the correlation engine for matching the touch signals to one of the plurality of signatures in the memory.

15. The stylus pen of claim 11, wherein the selected transmission protocol is controlled by a state machine.

16. The method of claim 1, wherein the different electrical characteristics of each protocol of the plurality of different protocols dictates one or more of voltage levels, operating frequencies, modulation types, and bit assignments of the signals generated by each of the plurality of different transmit circuits.

* * * * *